United States Patent Office 3,378,510
Patented Apr. 16, 1968

3,378,510
SCORCH RETARDERS FOR ETHYLENE-COPOLYMER RUBBER
Robert C. Wheat, Bartlesville, Okla., assignor to Phillips Petroleum Company, a corporation of Delaware
No Drawing. Filed Feb. 14, 1963, Ser. No. 258,654
12 Claims. (Cl. 260—23.7)

This invention relates to scorch retarders for ethylene-copolymer rubber.

Rubbery copolymers produced by copolymerizing, as primary monomers, ethylene and propylene are well known. Other 1-olefins containing up to 8 carbon atoms can be substituted for the propylene, examples including 1-butene, 1-pentene, up to 1-octene. Mixtures of such other olefins can be used. Combined ethylene in the polymer is usually from 20 to 80 weight percent. In addition to the copolymers of these monoolefins, some terpolymers have been made containing a small amount, usually less than 15 weight percent of a diolefin component.

As raw polymers these materials have potentially good properties and they can be manufactured in good yields from abundantly available, low cost sources. Subsequent to the discovery of these new rubbery copolymers, curing systems based upon the use of peroxides were developed. While good products were produced, there remained a difficulty in that the products had a great tendency to scorch.

An object of this invention is to provide a curing system for rubbery copolymers of ethylene whereby the tendency to scorch is reduced. A further object of this invention is to provide a new curing system for ethylene-propylene rubber. A further object is to provide new rubbery compositions.

Other objects and advantages of my invention will be apparent to one skilled in the art upon reading the disclosure.

I have discovered that significant reduction in the scorch tendency of rubbery copolymers of ethylene, particularly ethylene-propylene rubbers can be effected by incorporating therein a metal dialkyldithiocarbamate represented by the formula

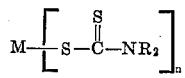

where M is metal, R is an alkyl group containing 1 to 4 carbon atoms, and n is a number equal to the valence of M. M can be sodium, potassium, copper, calcium, zinc, strontium, cadmium, barium, lead, bismuth, selenium, tellurium, cobalt, and nickel. Specific examples of these compounds are sodium dimethyldithiocarbamate, potassium diethyldithiocarbamate, sodium methyl isopropyldithiocarbamate, potassium dibutyldithiocarbamate, cupric dimethyldithiocarbamate, calcium diisobutyldithiocarbamate, zinc diethyldithiocarbamate, strontium dimethyldithiocarbamate, cadmium methyl ethyldithiocarbamate, barium diisopropyldithiocarbamate, lead dimethyldithiocarbamate, bismuth diethyldithiocarbamate, selenium dibutyldithiocarbamate, tellurium dipropyldithiocarbamate, cobalt dimethyldithiocarbamate, and nickel diethyldithiocarbamate.

A small amount of the scorch retarder will give a remarkable reduction in the scorch time, the range of 0.1 to 2 parts by weight per 100 parts of the rubber being preferred. In this work scorch was determined according to ASTM D 1646-61 using the Mooney shearing disk viscometer. The tests were made at 280° F. and the scorch time is the time required for an increase of 5 units above the minimum viscosity recorded on the machine.

It was a surprising discovery to find that these compounds serve as scorch retarders for ethylene-propylene rubber since heretofore in the compounding of rubbers such as natural rubber, butadiene-styrene copolymer rubbers, and the like, they have been used as ultra-accelerators. In fact, their accelerating power for other rubbers has been found to be so great that they were only sparingly used.

Many suitable peroxides are available for use in the curing system. In the example, I have used 2,5-bis(tert-butylperoxy)-2,5-dimethylhexane. Other suitable materials which can be substituted for this material include bis(alpha,alpha-dimethylbenzyl) peroxide, dibenzoyl peroxide, di-tert-butyl peroxide, cumene hydroperoxide, methyl ethyl ketone peroxide, and tert-butyl perbenzoate.

A small amount of sulfur is usually present in the system to reduce chain scission. Less than 0.5 part by weight based upon 100 parts of rubber is used. Other compounding ingredients such as fillers, extenders, plasticizers, antioxidants, pigments, dyes, and the like, which are normally included in rubbery compositions, can also be included if desired.

The following example illustrates a specific embodiment of my invention. It should not be considered unduly limiting.

Example

A commercial ethylene-propylene rubbery copolymer having a Mooney value of 42 and approximately 60 percent by weight of combined ethylene was compounded using a peroxide recipe. Two batches were prepared, one using cupric dimethyldithiocarbamate (Cumate), the other being run as a control. Data on these runs are shown in the following table:

| Run | 1 | 2 |
|---|---|---|
| EPR Rubber | 100 | 100 |
| Philblack O | 60 | 60 |
| Zinc Oxide | 5 | 5 |
| Calcium Stearate | 1 | 1 |
| Varox [1] | 6 | 6 |
| Sulfur | 0.32 | 0.32 |
| Cumate | 1.0 | 0 |
| Scorch at 280° F., min | 60.0 | 13.4 |

[1] A 50% active material containing equal parts of 2,5-bis(tert-butyel peroxy)-2,5-dimethyl hexane and an inert free-flowing mineral carrier sold by R. T. Vanderbilt Co.

These data show the powerful retarding effect of cupric dimethyldithiocarbamate on scorch of ethylene-propylene rubber.

The above example illustrates the invention using a substantially saturated rubber. The invention is also applicable to the peroxide curing of ethylene containing rubbers wherein a diolefin is used in addition to the second 1-olefin.

The diolefin may contain 4 to 22 carbon atoms in either a straight or branched chain. Examples of suitable diolefins in which both double bonds are terminal are 1,3-butadiene, 1,4-pentadiene, 1,5-hexadiene (biallyl), 2-methyl-1,5-hexadiene, 3,3-dimethyl - 1,5 - hexadiene, 1,7-octadiene, 1,9-decadiene, 1,19-eisocadiene, and the like. Also, the diolefin can be a cycle component such as dicyclopentadiene. Where a diolefin is used the combined weight percent should be less than 15 percent.

As many possible embodiments can be made of this invention without departing from the scope thereof, it is to be understood that all matter herein set forth is to be interpreted as illustrative and not as unduly limiting the invention.

I claim:

1. In the peroxide curing of rubbery copolymers of ethylene and at least one additional 1-olefin, the improvement comprising adding a cupric dialkyldithiocarbamate to reduce the scorching tendency of said rubbery copolymer.

2. The method of claim 1 wherein said rubbery copolymer is a copolymer of ethylene and propylene.

3. The method of claim 1 wherein said rubbery copolymer is a copolymer of ethylene and a diolefin.

4. The method of claim 1 wherein said metal dialkyldithiocarbamate is used in an amount of 0.1 to 2 parts by weight per 100 parts of said rubbery copolymer.

5. A method of curing ethylene-propylene rubber comprising using 2,5-bis(tert-butylperoxy) - 2,5 - dimethylhexane as the crosslinking agent and cupric dimethyldithiocarbamate to reduce the scorching tendency of said rubber.

6. A method of curing ethylene-propylene rubber comprising compounding same according to the following recipe, amounts being based upon 100 parts by weight of said rubber,

| | |
|---|---|
| Carbon black | 60 |
| Zinc oxide | 5 |
| Calcium stearate | 1 |
| 2,5-bis(tert-butylperoxy)-2,5-dimethylhexane | 3 |
| Sulfur | 0.32 |
| Cupric dimethyldithiocarbamate | 1 |

7. A rubber composition comprising a rubbery copolymer of ethylene and at least one additional 1-olefin, a peroxide capable of curing said rubbery copolymer, and a cupric dialkyldithiocarbamate, said cupric dialkyldithiocarbamate reducing the scorching tendency of said copolymer.

8. The composition of claim 7 wherein said rubbery copolymer is a copolymer of ethylene and propylene.

9. The composition of claim 7 wherein said rubbery copolymer is a copolymer of ethylene, propylene, and a diolefin.

10. The composition of claim 7 wherein said metal dialkyldithiocarbamate is present in an amount of 0.1 to 2 parts by weight per 100 parts of said rubbery copolymer.

11. A rubber composition comprising an ethylene-propylene rubber, 2,5 - (tert-butylperoxy)-2,5-dimethylhexane, and cupric dimethyldithiocarbamate.

12. A rubber composition comprising an ethylene-propylene rubber and, per 100 parts by weight of said rubber,

| | |
|---|---|
| Carbon black | 60 |
| Zinc oxide | 5 |
| Calcium stearate | 1 |
| 2,5-bis-(tert-butylperoxy)-2,5-dimethylhexane | 3 |
| Sulfur | 0.32 |
| Cupric dimethyldithiocarbamate | 1 |

References Cited

UNITED STATES PATENTS

| | | | |
|---|---|---|---|
| 2,448,799 | 9/1948 | Happoldt | 260—45.75 X |
| 2,582,510 | 1/1952 | Stiratelli | 260—45.75 X |
| 2,928,801 | 4/1960 | Safford | 260—41 X |
| 3,147,230 | 9/1964 | Gladding | 260—41 X |
| 3,173,903 | 3/1965 | Lukack et al. | 260—41 X |
| 3,000,866 | 9/1961 | Tarney | 260—80.5 |
| 3,278,480 | 10/1966 | Radcliff et al. | 260—41 |

OTHER REFERENCES

Robinson et al., Ethylene-propylene Rubber Vulcanization with Aralkyl Peroxide and Coagents in I & EC Product Research and Development, vol. 1, No. 2, June 1962, pp. 78–82.

MORRIS LIEBMAN, *Primary Examiner.*

J. H. DERRINGTON, *Assistant Examiner.*